United States Patent [19]

Gohlisch et al.

[11] Patent Number: 4,963,309
[45] Date of Patent: Oct. 16, 1990

[54] PROCESS AND APPARATUS FOR PROCESSING ELASTOMERIC MATERIALS IN PARTICULAR PLASTIC, RUBBER AND A MIXTURE THEREOF

[75] Inventors: Hans-Joachim Gohlisch, Hannover; Heinz Klein, Pattensen, both of Fed. Rep. of Germany

[73] Assignee: Paul Troester Maschinenfabrik, Hannover, Fed. Rep. of Germany

[21] Appl. No.: 315,341

[22] Filed: Feb. 24, 1989

[30] Foreign Application Priority Data

Feb. 29, 1988 [DE] Fed. Rep. of Germany ....... 3806387

[51] Int. Cl.$^5$ ............................................. B29C 47/32
[52] U.S. Cl. .................................... 264/175; 264/176.1; 264/177.1; 264/177.16; 425/194; 425/325; 425/327; 425/374; 425/382.3; 425/382.4; 425/466
[58] Field of Search ................... 264/175, 176.1, 177.1, 264/177.16; 425/327, 367, 325, 374, 466, 382.3, 382.4, 192 R, 194, 186, 205–207

[56] References Cited

U.S. PATENT DOCUMENTS

| | | | |
|---|---|---|---|
| 3,274,645 | 9/1966 | Chase | 425/367 |
| 3,393,425 | 7/1968 | Meienberg | 425/192 R |
| 3,408,694 | 11/1968 | Matsuoka | 425/186 |
| 3,871,810 | 3/1975 | Geyer | 425/374 |
| 4,060,368 | 11/1977 | Theysohn | 425/461 |
| 4,299,789 | 11/1981 | Giesbrecht | 425/374 |
| 4,539,169 | 9/1985 | Nixon et al. | 425/192 R |
| 4,576,563 | 3/1986 | Harada et al. | 425/382.3 |
| 4,642,039 | 2/1987 | Anders | 425/382.3 |
| 4,683,095 | 7/1987 | Tolonen et al. | 425/192 R |
| 4,744,745 | 5/1988 | Harada et al. | 425/374 |

FOREIGN PATENT DOCUMENTS 2532071 3/1976 Fed. Rep. of Germany ...... 264/175

Primary Examiner—Jeffery Thurlow
Attorney, Agent, or Firm—Robert E. Burns; Emmanuel J. Lobato

[57] ABSTRACT

The invention relates to a process and apparatus for processing elastomeric material in particular plastic, rubber and a mixture thereof in roller-head-apparatus in which the material to be processed is plasticized and homogenized in an extruder, extruded from an extrusion head provided on the extruder and then is led through an aperture formed between two rollers. It is the object of the present invention, with an especially simple extrusion head in a roller-head-apparatus to produce uniform and dimensionally exact sheets or foils of different thicknesses without changing structural parts. The invention achieves this in that material formed in plate form by parallel outlet surfaces of the extruder head is led through an aperture space formed between a concave cylindrical surface of a stationary forming tool and the circumferential surface of one of the rollers of the calender before the material enters the space between the two calender rollers.

11 Claims, 5 Drawing Sheets

PROCESS AND APPARATUS FOR PROCESSING ELASTOMERIC MATERIALS IN PARTICULAR PLASTIC, RUBBER AND A MIXTURE THEREOF

The invention relates to a process and an apparatus for processing elastomeric material in particular plastic, rubber or a mixture thereof in roller-head-apparatus in which the material to be processed is plasticized and homogenized in an extruder, is extruded through an extrusion head mounted on the extruder and is then led through an aperture formed between two rollers.

Such apparatus for processing elastomeric material is known from U.S. Pat. No. 4,060,368. With this known apparatus the extrudant is already so plasticized and homogenized in the extruder that no further disintegration of the material takes place in the calender. With this apparatus as with other known apparatus it is observed that the sheet of material leaving the calender has a thickness greater than the widest aperture of the calender. For the production of a sheet of precise thickness it is necessary to measure the thickness of the sheet produced and make corresponding correction of the aperture of the calender.

With the apparatus of U.S. Pat. No. 4,060,368 it is observed that the thickness of the sheet produced is not uniform but that in the middle the sheet corresponds exactly to the calender aperture dimension but is thicker on both sides.

Considerably greater difficulties arise when the extrudant is not fully disintegrated in the extruder, but a part of the disintegration occurs in the calender. Here there is the danger that with an alteration of the calender aperture, the material decomposes or prevulcanizes, or is not fully disintegrated as is described in DE-PS 24 50 225. With known apparatus it has been sought to improve product quality by exchanging, inserting or removing nozzle lip pairs of the nozzle mouth or by shifting the nozzle mouth forwardly or rearwardly in order to alter the extent of the roller surface contacted before the narrowest part of the calender aperture. In this manner, the work of decomposition effected by the calender is adjusted to a particular value. Thus an overheating of the material with its detrimental effect on product quality is lessened However, for each calender aperture adjustment it is also necessary to exchange the nozzle lips. This exchange of nozzle lips hinders the production Also here the sheets or foils produced have a greater thickness than the dimension of the calender aperture.

It is an object of the present invention, with a particularly simple extrusion head construction in a roller-head-apparatus, to produce sheets or foils which are highly homogenous and have a thickness corresponding exactly with the calender aperture without it being necessary to exchange parts in order to alter the sheet or foil thickness.

The invention achieves this in that the material formed into a sheet by parallel outlet surfaces of the aperture of the extrusion head of the extruder, is led through an aperture formed between a part of the circumferential surface of one roller, which is adjustable to the desired aperture thickness, and a concave surface of a stationary forming tool corresponding to the circumferential surface of such roller, before the material enters the aperture between the two rollers.

The arrangement in accordance with the invention is characterized in that the aperture of the mouthpiece of the extrusion head is formed of two parallel surfaces, that a divider for distributing the material transversely is provided in the extrusion head between the parallel surfaces and the extruder and that, spaced from one roller of the calender upstream of the calender aperture and downstream of the mouthpiece of the extruder, there is arranged a stationary forming tool with a concave surface corresponding to the circumferential surface of a roller of the calender.

Hereby, a uniformly thick sheet is extruded out of the mouthpiece of the wide extrusion head, and, before it passes through the narrowest part of the roller aperture, is drawn with the help of one calender roller and pushed by the extrusion pressure through a not essentially greater aperture. In this aperture space between the stationary forming tool with a concave outer face and the rotating calender roller, the material comprising macromolecules is aligned in a forward direction. It is thereby achieved that the extruded and, in this manner forwardly aligned material, after leaving the narrowest part of the roller aperture is no more strongly thinned. The pulling component effects a pressure drop in the head. Thereby the final force and mass temperature are, for example, limited.

Surprisingly it has been determined that this outstanding homogenity and this property of not extending crosswise to the forward direction behind the narrowest part of the roller aperture remains with roller aperture adjustment and thus by the production of sheets of different thickness without changing extrusion nozzle lips or other parts.

This determination is explained by the fact that an alignment of the macromolecules is effected in the aperture space between the stationary forming tool and the one rotating roller. In this aperture space movement is imparted to the extrudant on only one side namely from the side of the roller. On the opposite side there is the stationary forming tool which exerts no movement on the material. There the roller moves the closer lying material faster than the material more distant from the roller thus producing a velocity difference in the material flow. This velocity difference works in the manner that the parts provided with form memory which, through their processing in the extruder, are displaced out of their original positions into other positions, can resume their original positions whereby they lie in the forward direction. Thereby the material parts with form memory lying in a longitudinal direction take less room than the disarranged and crosswise lying material parts. As soon as they have reached their original longitudinal arrangement, they flow more easily and rapidly through the aperture space. This arrangement of the material parts provided with form memory in the transport direction leads also to the fact that, after leaving the narrowest part of the roller aperture, the produced sheet becomes only insignificantly thicker because there are only a few material parts which, after their processing have not, because of their form memory, returned from their deformed position to their original position. The result of the processing in accordance with the invention is thus a greater homogenity and a product remarkably exact in its dimensions. From the point of view of the process technique, it is surprising that a simple adjustment of the two rollers and thus a simple alteration of the roller aperture sheets of different thickness but uniform homogenity and like exactness can be produced.

From a construction point of view it is particularly simple when the forming tool is mounted fixedly on one half of the extrusion head or a projecting part of this half and when the outer face merges smoothly into the surface of the extrusion mouth of the extrusion head.

In order to avoid replacement of the entire extrusion head half upon the appearance of abrasion on the forming tool, it is advantageous when the upper surface of the forming tool is formed as an interchangeable bar and mounted on the one half of the extrusion head.

BRIEF DESCRIPTION OF DRAWING

The nature of the present invention and the distinction between the present invention and the apparatus of U.S. Pat. No. 4,060,368 will appear more fully from the following description in conjunction with the accompanying drawings in which.

DESCRIPTION OF PREFERRED EMBODIMENTS

Figure 1:
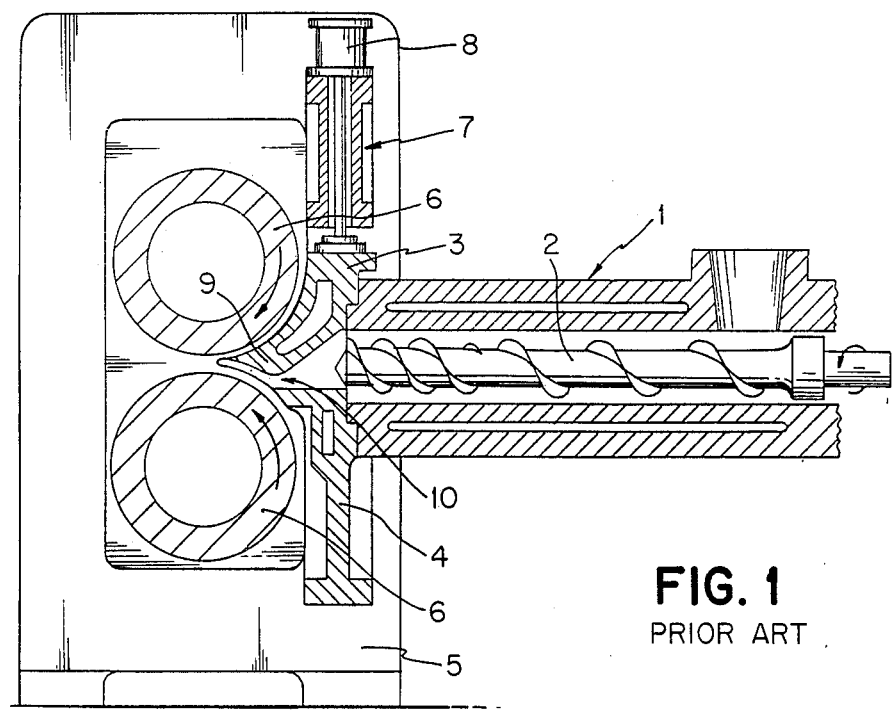
FIG. 1 is a central section of the known apparatus in assembled condition.

In the extruder 1 the elastomeric material is disintegrated by means of the screw 2 and is extruded throught the wide extrusion head 3,4 into the aperture between calender rollers 6 which are adjustably and rotatably supported in the calender stands 5. In order to facilitate cleaning, the extruder is arranged movably with respect to the calender 5, 6, the upper part of the wide extrusion head 3 being fixed on the extruder and the lower part 4 of the wide extrusion head being fixed on the calender stands. The two parts of the wide extrusion head are pressed together by a closing device 7 which is secured on the calender stands and in which a hydraulic cylinder 8 presses a strut on the upper part 3 of the wide extrusion head and thereby presses the upper part 3 on the lower part 4 of the wide extrusion head.

Figure 4:
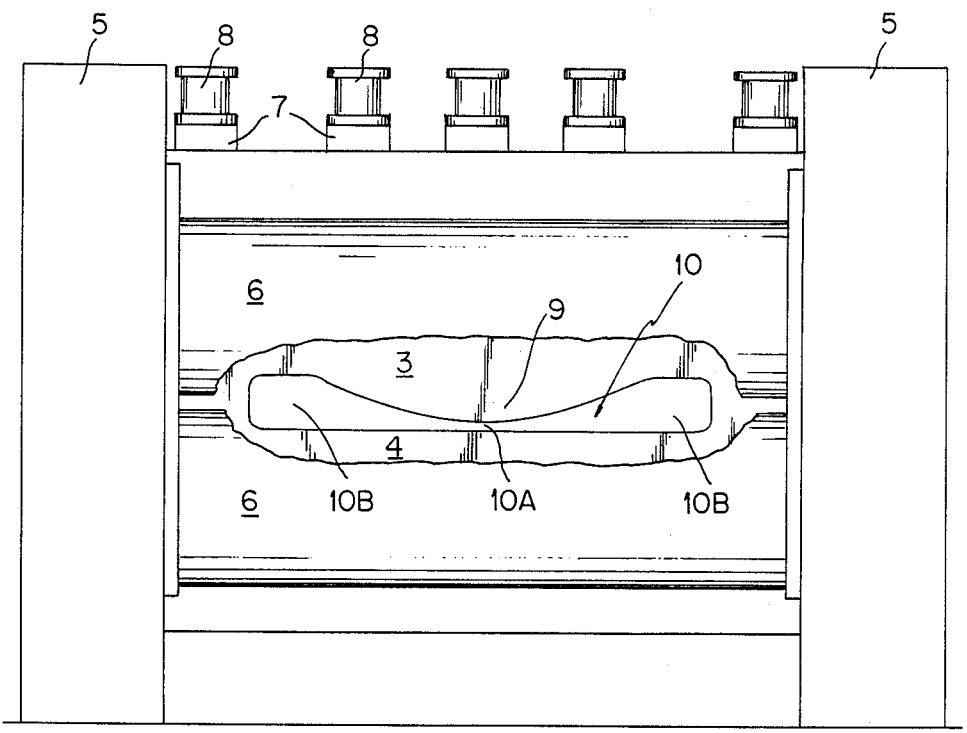
FIG. 4 is a front elevation of the extrusion head of the known apparatus as seen through a break-out of the calender rollers.

This apparatus known through U.S. Pat. No. 4,060,368 has in the wide extrusion head 3, 4 a centrally arranged dividing island 9 which serves to divide the material extruded in a narrow web and distribute it across the width of the wide extrusion head. This dividing island 9 is arranged in the wide extrusion head 3, 4 in such manner that it extends deep into the space between the two calender rollers 6 and gives the nozzle mouth an arbitrary form such that the nozzle mouth is very narrow in the middle and is wide at both sides as seen in FIG. 4. This nozzle mouth 10 has at the middle a very narrow region 10A and to both sides wide regions 10B. With this known apparatus there is produced as a product a sheet or foil which is thicker than the roller aperture in its narrowest position. Moreover, the sheet produced is also not fully homogenous. At both sides the material extruded out of the parts 10B of the nozzle mouth has a slightly greater thickness than the middle part extruded out of the nozzle part 10A.

Figure 5:
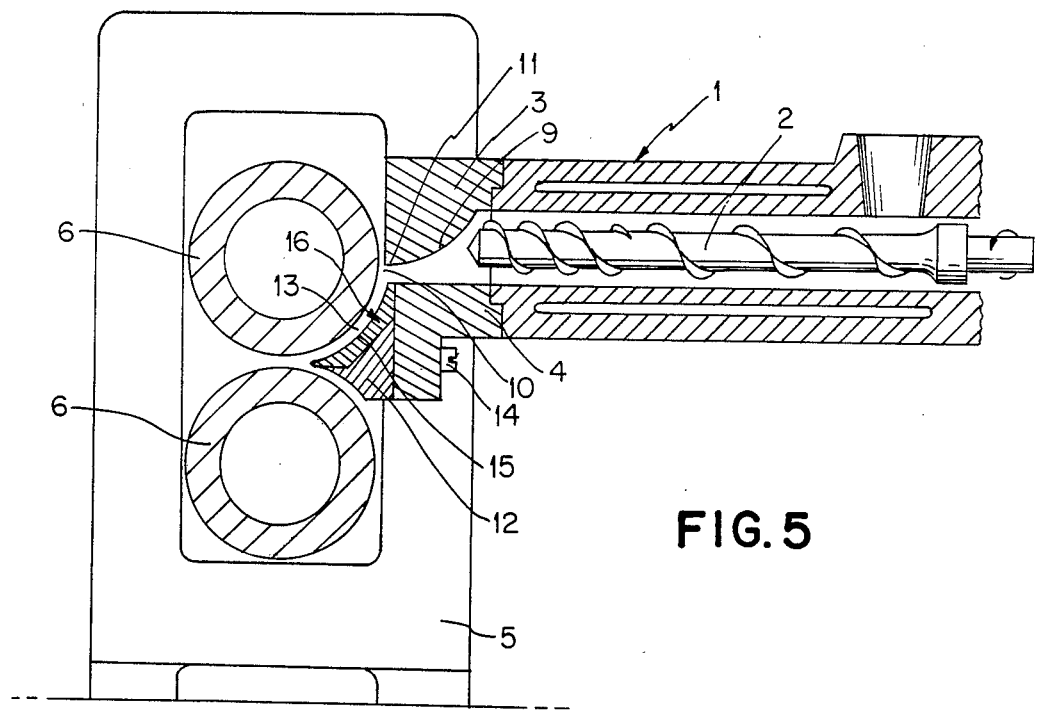
FIG. 5 is a central section of apparatus in accordance with the present invention.
Figure 6:
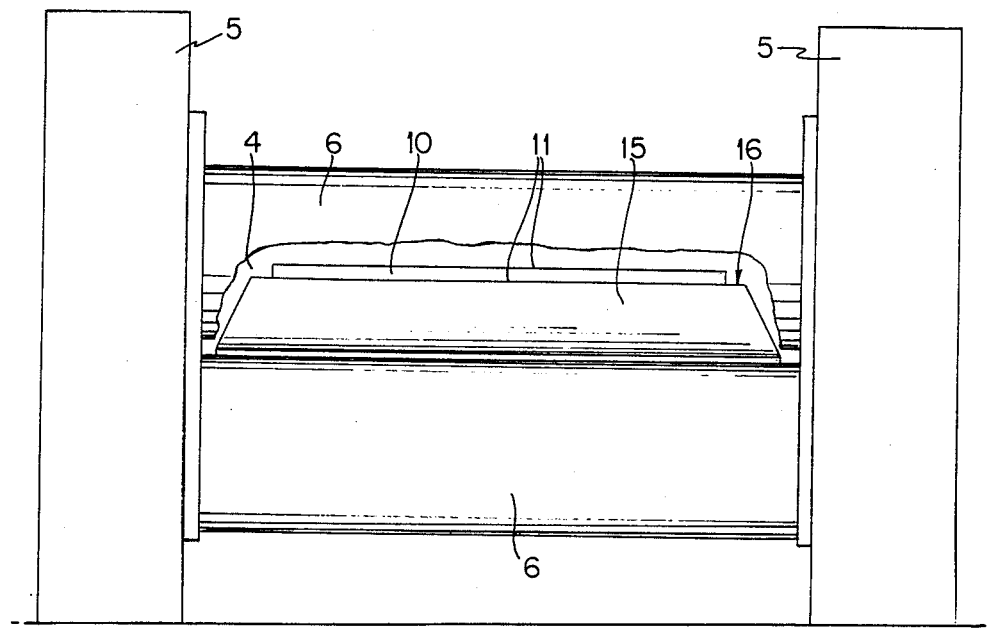
FIG. 6 is a front elevation of the extrusion head as seen through a break-out of the calender rollers.
Figure 7:
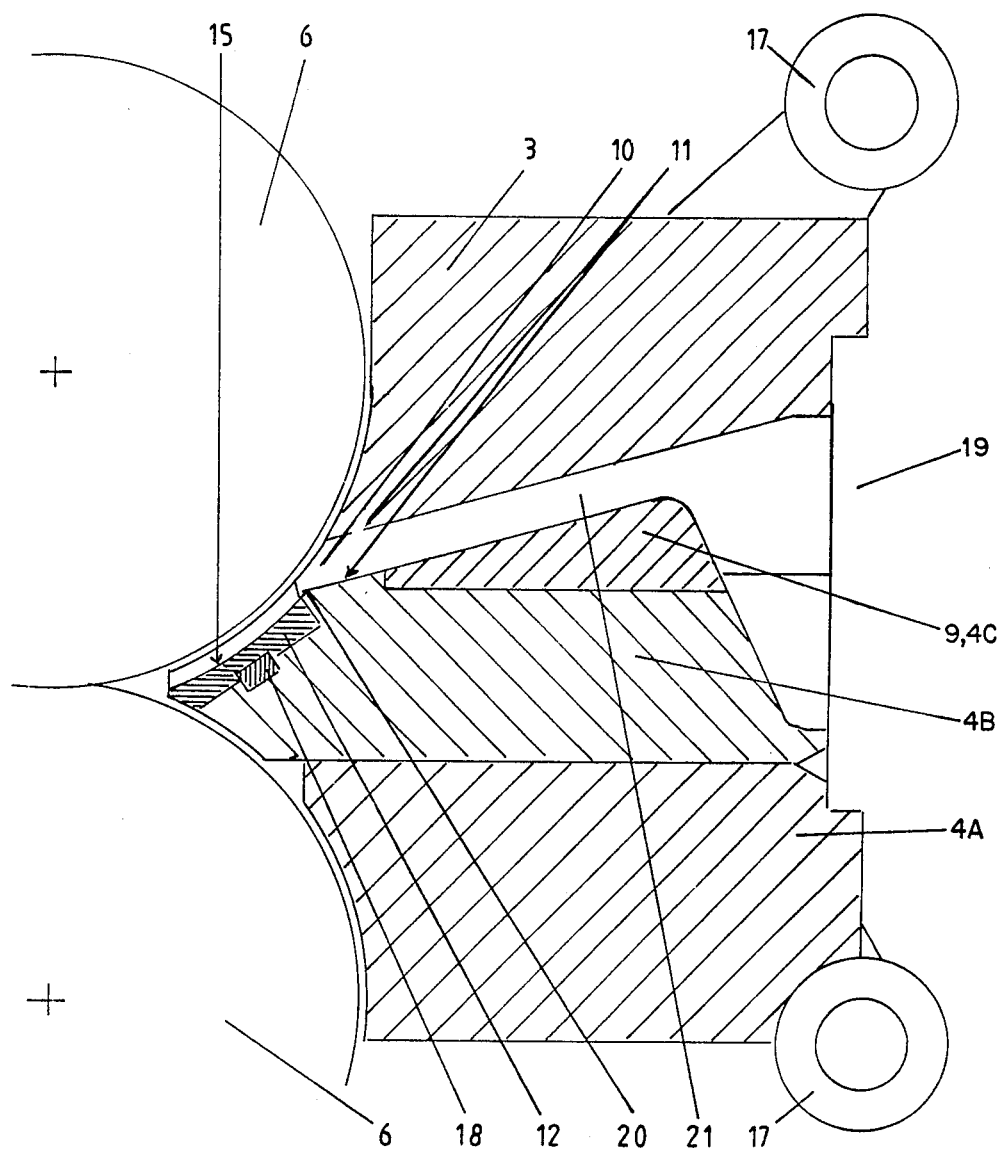
FIG. 7 is a section through another wide extrusion head.
Figure 8A:
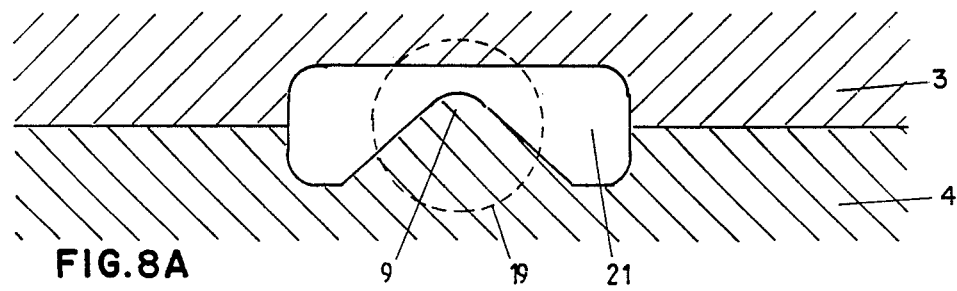
FIGS. 8A to 8E show cross sections through a wide extrusion head taken at successive locations.
Figure 8B:
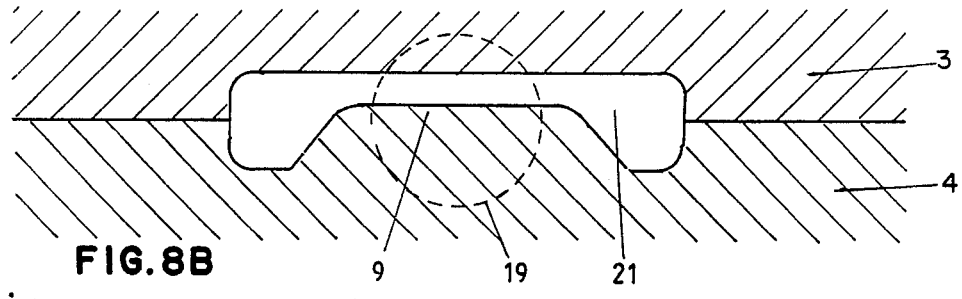
Figure 8C:
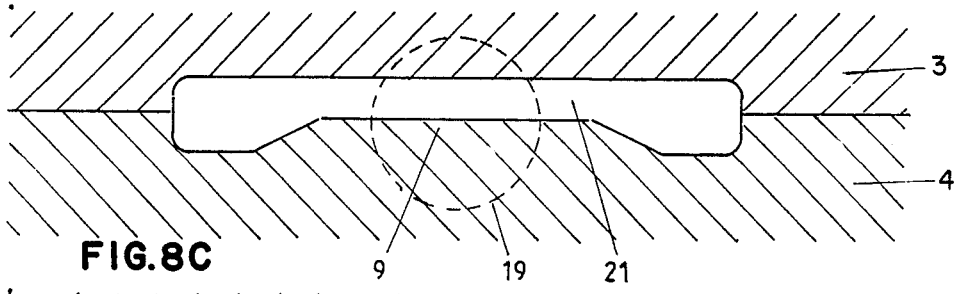
Figure 8D:
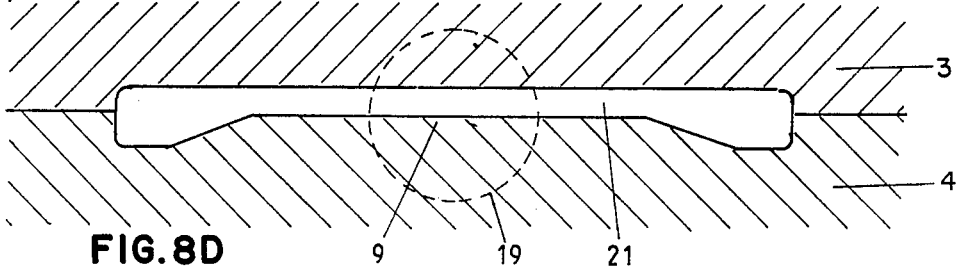
Figure 8E:
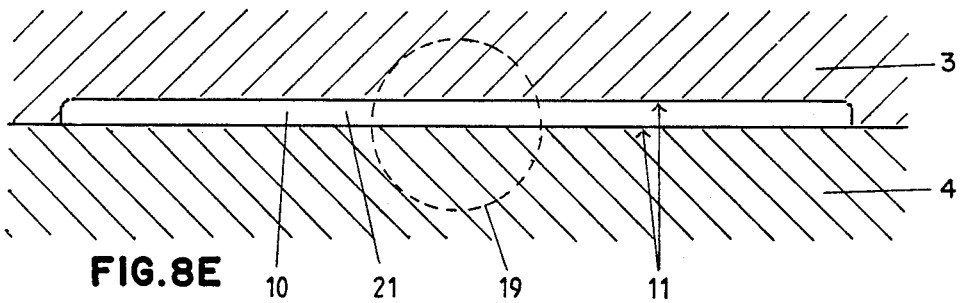

In FIGS. 5 to 7 there is shown apparatus in accordance with the invention. Like parts are here shown with the same reference numerals as in FIGS. 1 to 4. Also here an extruder 1 is provided with a screw 2, the wide extrusion head 3, 4 has an upper part 3 and a lower part 4 and in the calender stands 5 there are two adjustable calender rollers 6. In the wide extrusion head 3, 4 there is provided a dividing island 9 which presses the material to be extruded inside the wide extrusion head 3, 4 from the middle path to the sides of the wide extrusion head 3, 4. The essential differences with respect to the known apparatus are the following. The extrusion mouth 10 is formed by two parallel surfaces 11 extending over the entire width of the extrusion mouth. As seen in FIG. 5, the extrusion mouth 10 of the extrusion head 3, 4 is positioned at approximately the level of the axis of the upper calender roller 6 and thus directs a sheet of material extruded from the extrusion head onto the circumferential surface of the upper calender roller 6 at about 90° circumferentially in advance of the nip between the calendar rollers. Moreover, in the space between the calender rollers there extends a forming tool 12 which is mounted on one of the two parts of the wide extrusion head 3, 4. In the example shown, the forming tool 12 is mounted on the lower part 4 of the wide extrusion head and has a stationary elongate concave cylindrical surface facing and spaced by the desired thickness of the sheet from the cylindrical surface of the upper calendar roller. Of the two calender rollers 6 only the upper calender roller is adjustable in order to alter the roller aperture adjustment of the upper calendar roller 6 by moving it toward or away from the forming tool 12 is the only alteration required to alter the thickness of the sheet.

If the forming tool 12 were mounted on the upper part 3 of the wide extrusion head 3, 4, the lower roller 6 would be adjustable. Thus the forming tool 12 always has a constant spacing from the lower roller 6 while the spacing to the upper roller is variable according to the desired sheet or foil thickness. Between the adjustable roller 6 and the forming tool 12 there is thus formed an aperture 13 through which the extrudant flows to the narrowest position of the aperture between the two calender rollers 6. In this aperture space 13 the above mentioned alignment of the material parts occurs because here the material flows through an aperture space 13 of which one wall is formed by the rotating upper roller 6 and the other wall is formed by the stationary upper surface of the forming tool 12.

As the dividing island 9 is arranged in the interior of the wide extrusion head without altering the geometry of the nozzle mouth 10, there is extruded out of the wide extrusion head a sheet with parallel upper and lower surfaces and the nozzle mouth has two parallel bounding surfaces. Out of the nozzle mouth there flows an extrudant which is fully disintegrated so that the calender exerts no disintegrating work on the extrudant but only forming work in particular through the alignment of the parts of the extrudant in a forward direction.

There is thus obtained as a product a sheet or foil characterized by an outstanding homogenity with precise dimensions. In changing from one sheet thickness to another it is necessary only to adjust the upper roller. Further measures are not needed.

In order easily to replace a worn forming tool it is advantageous when the forming tool 12 is secured on the lower part 4 of the wide extrusion head by means of screws 14 or the active surface 15 of the forming tool is formed by an interchangeable bar 16. An interchange of this bar 16 is effected only with a like bar. The exchange takes place when, for example, when working with an extrudant containing abrasives the upper surface of the bar 16 becomes worn.

Figure 2:
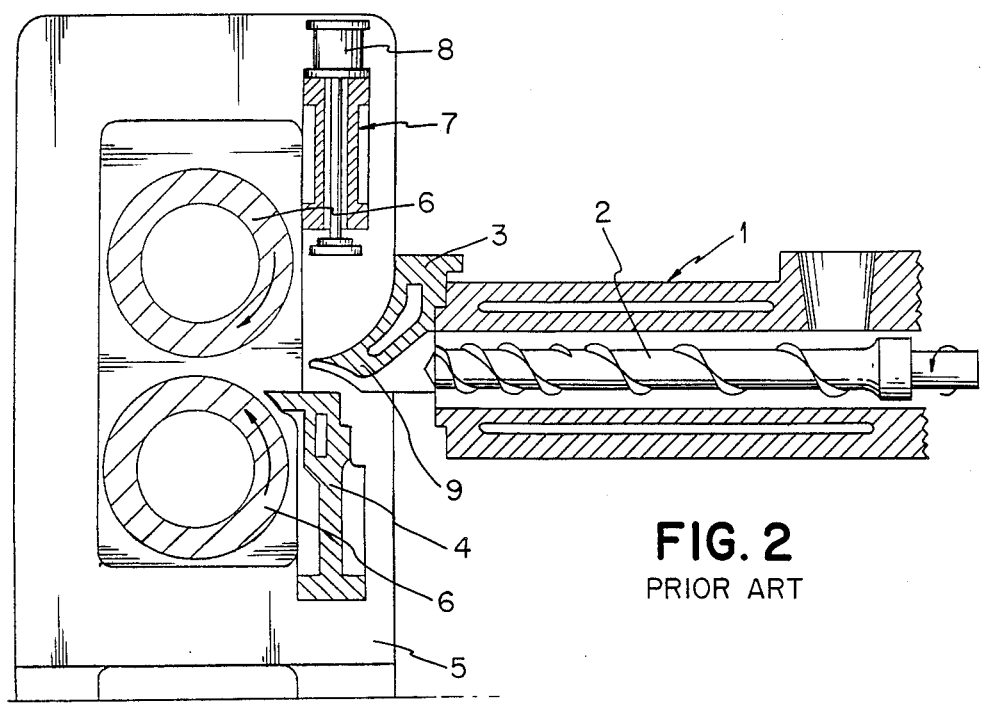
FIG. 2 is a central section in disassembled condition.
Figure 3:
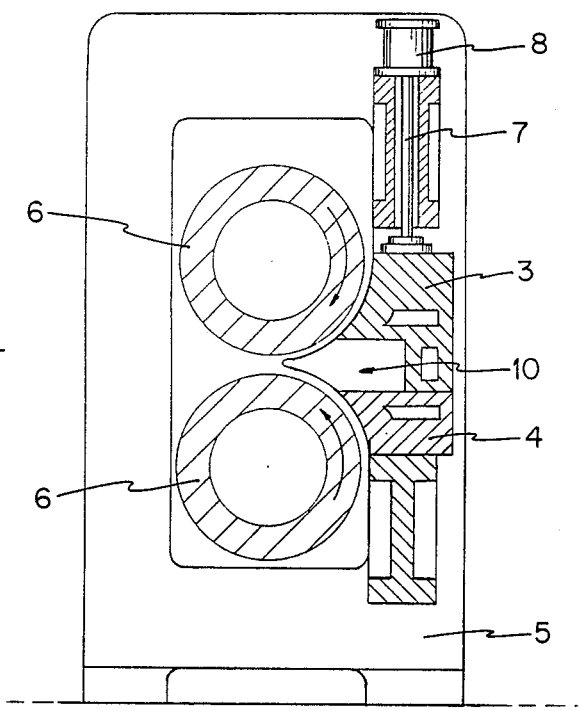
FIG. 3 is a side section of the apparatus in assembled condition.

The wide extrusion head can comprise two superposed parts of which one is mounted on the calender and the other is mounted on the extruder as illustrated in FIG. 2. However, both parts of the wide extrusion head can also be mounted on the extruder or both can be mounted on the calender.

In the embodiment illustrated in FIG. 7 both wide extrusion head parts 3 and 4 are mounted by hinged joints 17 on the extruder. The lower extrusion head part 4 is composed of three superposed pieces 4A, 4B and 4C. Through the substitution of the pieces 4B and/or 4C the flow geometry can be altered. The bar 16 is fitted on the middle workpiece 4B and is retained by a key 18.

The flow geometry of an extrusion head 3, 4 in apparatus according to the present invention is seen from FIG. 8 in which different sections ranging from section A (at a location close to the end of the extruder screw) to section E (nozzle mouth 10 i.e. outlet opening directly before the calender rollers 6) are represented. The section through the two parallel surfaces 11 forming the outlet opening 10 has an elongate rectangular section. In the wide extrusion head the extrudant has changed from the cylindrical form shown by the broken line 19 through the flow path 21 of the wide extrusion head as illustrated by the sections A to D in which the extrudant through the dividing island 9 is pushed more and more to the sides of the flow passage until it reaches plate form as it leaves the outlet opening and enters the calender. While in the prior art the extrudant leaves the extruder in the form illustrated in FIG. 8A or 8B and enters the calender which thus has considerable form work to do, according to the invention it is quite different. The material already in plate form fed to the calender is subjected to a shearing action between the stationary forming tool 12 in the form of a concave cylindrical plate and a rotating calender roller 6 which leads to alignment of the molecules of the extrudant which over the entire width and the entire cross section is uniform.

Thereby the deflection of the extrudant around the edge 20 can be of essential technical significance.

We claim:

1. Process of processing elastomeric material, in particular plastic, rubber or a mixture thereof to form a sheet of uniform thickness which comprises, plasticizing and homogenizing said material in an extruder, extruding said material through an extrusion head having an elongate extrusion aperture defined by straight, parallel outlet surfaces extending the full width of said aperture to form said material into a sheet of uniform thickness throughout its width;

directing said extruded sheet of material onto a circumferential surface of one roller of a calendar comprising two rollers rotating in opposite directions with a nip between said rollers, passing said sheet of material through a curved passageway between the circumferential surface of said one rotating roller on which it is directed and a stationary elongate concave cylindrical surface facing and spaced by the thickness of said sheet from said circumferential surface of said one rotating roller, movement being thereby imparted to said sheet of material in said passageway on only one side thereof, namely the side facing said one rotating roller, to effect an alignment of macromolecules of said material, and then passing said sheet of material through the nip between said rollers.

2. Process according to claim 1, further comprising distributing said material laterally thereof only at a location upstream of said extrusion aperture.

3. Process according to claim 1, further comprising moving said one rotating roller to vary the distance between said one roller and said stationary concave cylindrical surface and the distance between said one roller and the other roller of said calendar to thereby alter the thickness of the sheet produced, said movement of said one roller being the only adjustment made to alter said thickness.

4. Process according to claim 1, in which said extruded sheet of material is directed onto the circumferential surface of said one roller at about 90° circumferentially in advance of the nip between said rollers.

5. Apparatus for processing elastomeric material, in particular plastic, rubber or a mixture thereof to form a sheet of uniform thickness which comprises, a calender comprising two rollers rotating in opposite directions with a nip between them, an extruder comprising means for plasticizing and homogenizing said material and an extrusion head having an extrusion aperture defined by two straight parallel outlet surfaces extending the full width of said aperture for extrusion of said material in the form of a sheet having uniform thickness throughout its width, said extruder being positioned to direct said sheet of extruded material onto a circumferential surface of one roller of said calender at a location circumferentially spaced from the nip between said rollers, passageway defining means comprising a stationary elongate concave cylindrical surface facing and spaced from the circumferential surface of said one roller between the nip between said rollers and the location at which said sheet of extruded material is directed onto the circumferential surface of said one roller to define a curved passageway for said sheet of extruded material from said extrusion aperture to the nip between said rollers, in which passageway movement is imparted to said sheet of extruded material on only one side thereof, namely the side facing said one roller, to effect an alignment of macromolecules of said material.

6. Apparatus according to claim 5, in which said concave cylindrical surface merges smoothly with one of said outlet surfaces of said extrusion aperture.

7. Apparatus according to claim 5, in which said one roller of said calender is movable toward and away from said concave cylindrical surface and toward and away from the other of said two rollers of said calender to alter the thickness of the sheet of material produced, said movement of said one roller being the only alteration required to alter the thickness of said sheet.

8. Apparatus according to claim 5, further comprising a divider island of varying width in said extrusion head upstream of said extrusion aperture for pressing the material to be extruded from a middle path toward the sides of said extrusion head.

9. Apparatus according to claim 5, in which said two rollers of said calender are disposed one above the other and in which the roller to which said sheet of extruded material is directed by said extruder is the upper roller.

10. Apparatus according to claim 9, in which said passageway defining means comprises a member mounted on said extrusion head below said extrusion aperture and having said concave cylindrical surface facing and spaced from said upper roller of said calender.

11. Apparatus according to claim 9, in which said extrusion aperture of said extrusion head is positioned at approximately the level of the axis of said upper roller.

* * * * *